(12) United States Patent
Smith et al.

(10) Patent No.: US 8,162,070 B2
(45) Date of Patent: Apr. 24, 2012

(54) HYDRAULIC SHOCK DISSIPATION FOR IMPLEMENT BOUNCE

(75) Inventors: Kevin M. Smith, Narvon, PA (US); John H. Posselius, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 406 days.

(21) Appl. No.: 12/203,557

(22) Filed: Sep. 3, 2008

(65) Prior Publication Data
US 2010/0051298 A1 Mar. 4, 2010

(51) Int. Cl.
*A01B 41/06* (2006.01)
(52) U.S. Cl. ........................................... 172/2
(58) Field of Classification Search ............... 172/2
See application file for complete search history.

(56) References Cited

U.S. PATENT DOCUMENTS

| | | | |
|---|---|---|---|
| 3,058,310 A * | 10/1962 | Panissidi | 91/189 R |
| 4,468,050 A * | 8/1984 | Woods et al. | 280/5.514 |
| 4,757,685 A | 7/1988 | Burckhartzmeyer | |
| 5,147,172 A * | 9/1992 | Hosseini | 414/719 |
| 5,520,499 A | 5/1996 | Ufheil et al. | |
| 5,600,955 A | 2/1997 | Sahinkaya | |
| 5,622,226 A * | 4/1997 | Hausman et al. | 172/4.5 |
| 5,832,730 A | 11/1998 | Mizui | |
| 5,890,870 A * | 4/1999 | Berger et al. | 414/699 |
| 5,897,287 A | 4/1999 | Berger et al. | |
| 5,992,147 A | 11/1999 | Tajima | |
| 6,382,326 B1 | 5/2002 | Goins et al. | |
| 6,654,675 B2 | 11/2003 | Pedersen et al. | |
| 6,666,125 B2 | 12/2003 | Gunzenhauser | |
| 6,705,079 B1 | 3/2004 | Tabor et al. | |
| 6,749,035 B2 | 6/2004 | Bundy | |
| 6,854,269 B2 | 2/2005 | Hale | |
| 7,059,126 B2 | 6/2006 | Ma | |
| 7,269,947 B2 | 9/2007 | Yoshino | |
| 7,278,262 B2 | 10/2007 | Moon | |
| 7,308,789 B2 | 12/2007 | Lee | |
| 7,513,521 B2 * | 4/2009 | Posselius et al. | 280/463 |
| 7,756,622 B2 * | 7/2010 | Gianoglio et al. | 701/50 |
| 2003/0085042 A1 * | 5/2003 | Rogala | 172/2 |
| 2006/0070757 A1 * | 4/2006 | Posselius et al. | 172/677 |
| 2008/0257569 A1 * | 10/2008 | Foster et al. | 172/9 |
| 2010/0018726 A1 * | 1/2010 | Chiocco | 172/1 |

* cited by examiner

*Primary Examiner* — Thomas Will
*Assistant Examiner* — Joel F. Mitchell
(74) *Attorney, Agent, or Firm* — Patrick M. Sheldrake

(57) ABSTRACT

To dissipate hydraulic shock created by the bouncing of an implement mounted on a wheeled vehicle, such as a towed tillage implement or the bucket of a vehicle, such as a wheel loader, an electronic control valve, which supplies hydraulic fluid to the hydraulic actuator that raises and lowers the implement, is actively controlled by an electronic controller. As the vehicle with an implement is transported at higher speeds, the implement tends to bounce creating pressure spikes in the hydraulic system that raises and lowers the implement. The pressure spikes are dissipated by actively generating random or cancelling hydraulic pulses in the hydraulic system.

20 Claims, 5 Drawing Sheets

HYDRAULIC SHOCK DISSIPATION FOR IMPLEMENT BOUNCE

FIELD OF THE INVENTION

The present invention relates to a towed work vehicle having an implement that is operated with a hydraulic actuator, such as a tillage implement or soil working device, including a seed planter, plow, harrow and dibble, that is towed by a tractor, or a work vehicle, such as a wheeled loader or a backhoe having an implement that is operated with a hydraulic actuator. In particular, the present invention relates to controlling implement bounce during travel of the vehicle at higher speeds.

BACKGROUND OF THE INVENTION

Various types of farm, off-road of construction vehicles are used to perform tillage and excavation functions such as plowing, planting, harvesting, leveling, digging, material handling, trenching etc. These operations are typically accomplished with the use of a hydraulically operated implement. These implements include implements towed vehicle and implements translationally supported and rotationally supported on a vehicle by a plurality of linkages. The implements are moved relative to the supports by hydraulic cylinders or motors. These vehicles are often required to travel on roads between job sites. Accordingly, it is important that the vehicle travel at reasonably high speeds, greater than 15 mph. However, due to the suspension, or lack thereof, the implements supported on the vehicle, bounce, pitch or oscillate at speeds satisfactory for road travel. This implement movement can result in the vehicle bouncing, pitching or oscillating.

In an attempt to improve roadability, various systems have been developed for interacting with the implements and their associated linkages and hydraulics to control bouncing and oscillation of the vehicles while operating at road speeds. One such system includes circuitry for lifting and tilting an implement combined with a shock absorbing mechanism. This system permits relative movement between the implement and the vehicle to reduce pitching of the vehicle during road travel. To inhibit inadvertent vertical displacement of the implement, the shock absorbing mechanism is responsive to lifting action of the implement. The shock absorbing mechanism is responsive to hydraulic conditions indicative of imminent tilting movement of the implement, thereby eliminating inadvertent vertical displacement of the implement.

Other systems for improving the performance of excavators have included accumulators that are connected and disconnected to the hydraulic system depending upon the speed of the vehicle. More specifically, the accumulators are connected to the hydraulic system when the vehicle is at speeds indicative of a driving speed and disconnected at speeds indicative of a loading or dumping.

Other systems include controllers that determine the acceleration of the vehicle based upon the pressure of the hydraulic actuator that lifts the implement and that generate an acceleration signal representative of the acceleration of the vehicle. The controller applies control signals to an electronic control valve to cause the electronic control valve to control the flow of hydraulic fluid applied to the actuator to maintain the pressure signal substantially constant based upon the acceleration signal.

These systems may have provided improvements in roadability, but it would be desirable to provide an improved system to actively dissipate the bounce in an implement with hydraulic lift. Accordingly, the present invention provides a control system which controls the pressure in the hydraulic lift cylinders of the implement or implements associated with the vehicle. The control system dissipates or disrupts the hydraulic pressure fluctuations and consequently reduces the implement bounce.

SUMMARY OF THE INVENTION

In a preferred form of the invention, a control system for a vehicle having an implement moveable relative to the vehicle includes a pressurized fluid source, a hydraulic actuator, an electronic control valve, a transducer or a switch, and an electronic controller. The hydraulic actuator is mechanically coupled between the vehicle and the implement or between the implement frame and the implement transport wheels to lift the implement. The electronic control valve is fluidly coupled to the pressurized fluid source and the hydraulic actuator to control the flow of pressurized fluid that is applied to the hydraulic actuator by the pressurized fluid source. The electronic control valve has raise, neutral and lower positions. The pressurized fluid is applied to the hydraulic actuator by the pressurized fluid source to raise the implement relative to the vehicle when the electronic control valve is in the raise position and pressurized fluid is applied to the hydraulic actuator by the pressurized fluid source to lower the implement relative to the vehicle when the electronic control valve is in the lower position. The transducer generates an activation signal related to the pressure in the hydraulic actuator or the speed of the vehicle. The electronic controller is electrically coupled to the electronic control valve and the transducer or the switch. The electronic controller is programmed to generate valve command signals based upon the activation signal or position of the switch and apply the command signals to the electronic control valve to cause the electronic control valve to control the flow of pressurized fluid applied to the hydraulic actuator to actively dissipate implement bounce. The electronic controller is programmed to compare the activation signal to a predetermined threshold value or determine the position of the switch, and when the predetermined threshold value is exceeded or the switch is in the activation position, to activate the electronic control valve to cycle the electronic control valve from the neutral position to the raise position and back to the neutral position, and from the neutral position to the lower position and back to the neutral position, creating hydraulic pulses in the hydraulic actuator and dissipating implement bounce. The frequency of the hydraulic pulses is either random or out of phase with the implement bounce if the electronic control valve is activated by the predetermined threshold value being exceeded and random if the electronic control valve is activated by positioning the switch in the activation position.

The invention also includes a vehicle in which the control system is installed. Further, the invention includes a method of dissipating implement bounce in a vehicle using the control system by comparing the activation signal generated by a transducer to a predetermined threshold value or determining the position of a switch, and if the activation signal exceeds the predetermined threshold value or the switch is in the activation position, activating the electronic control valve to cycle from the neutral position to the raise position and back to the neutral position, and from the neutral position to the lower position and back to the neutral, creating hydraulic pulses in the hydraulic actuator and dissipating implement bounce. The frequency of the hydraulic pulses is either random or out of phase with the implement bounce if the electronic control valve is activated by the predetermined threshold value being exceeded and random if the electronic control valve is activated by positioning the switch in the activation position.

DETAILED DESCRIPTION OF THE INVENTION

Figure 1:
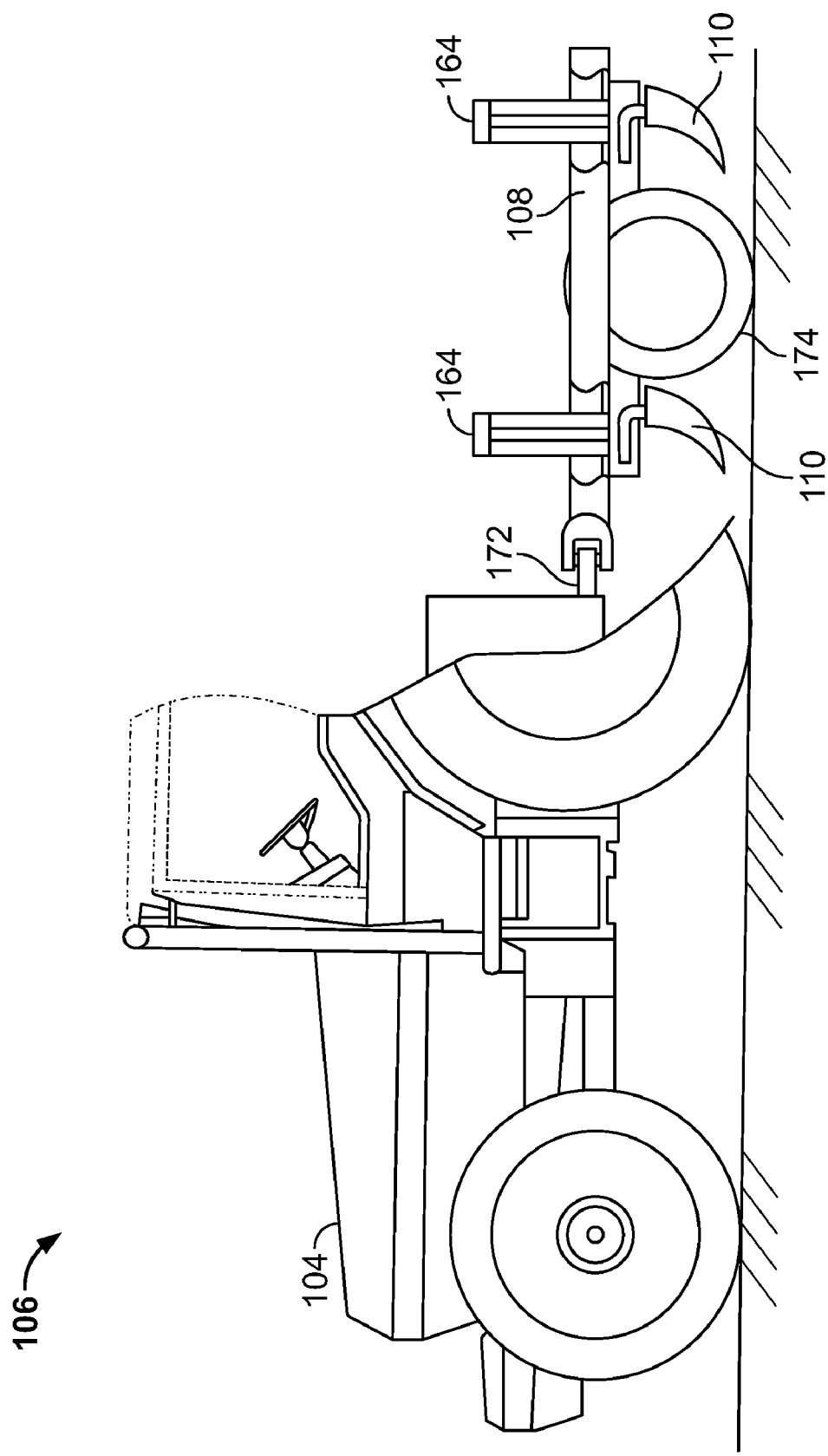
FIG. 1 is a schematic side elevation view of a tractor and tillage implement with the tillage implement shown in transport position with portions broken away.

While the present invention is susceptible of embodiment in various forms, there is shown in the drawings and will hereinafter be described preferred embodiments of the present invention with the understanding that the present disclosure is to be considered as an exemplification of the invention that is not intended to limit the invention to the specific embodiment illustrated.

Referring now to FIG. 1, a tractor 104 tows a soil-working vehicle 106. The vehicle 106 includes a frame 108, to which one or more agricultural implements or tools 110 are movably mounted. The implement shown in FIG. 1 being a plow. The frame 108 is connected to a draw bar 172 of the tractor 104 or other agricultural vehicle, and is moved through the fields or over roads on wheels 174. Hydraulic actuators 164 that are supported by frame 108 and control the position of implements 110. The implements 110 are shown in the transport position. To till the soil, the implements 110 are lowered by the hydraulic actuators into the ground.

Figure 2:
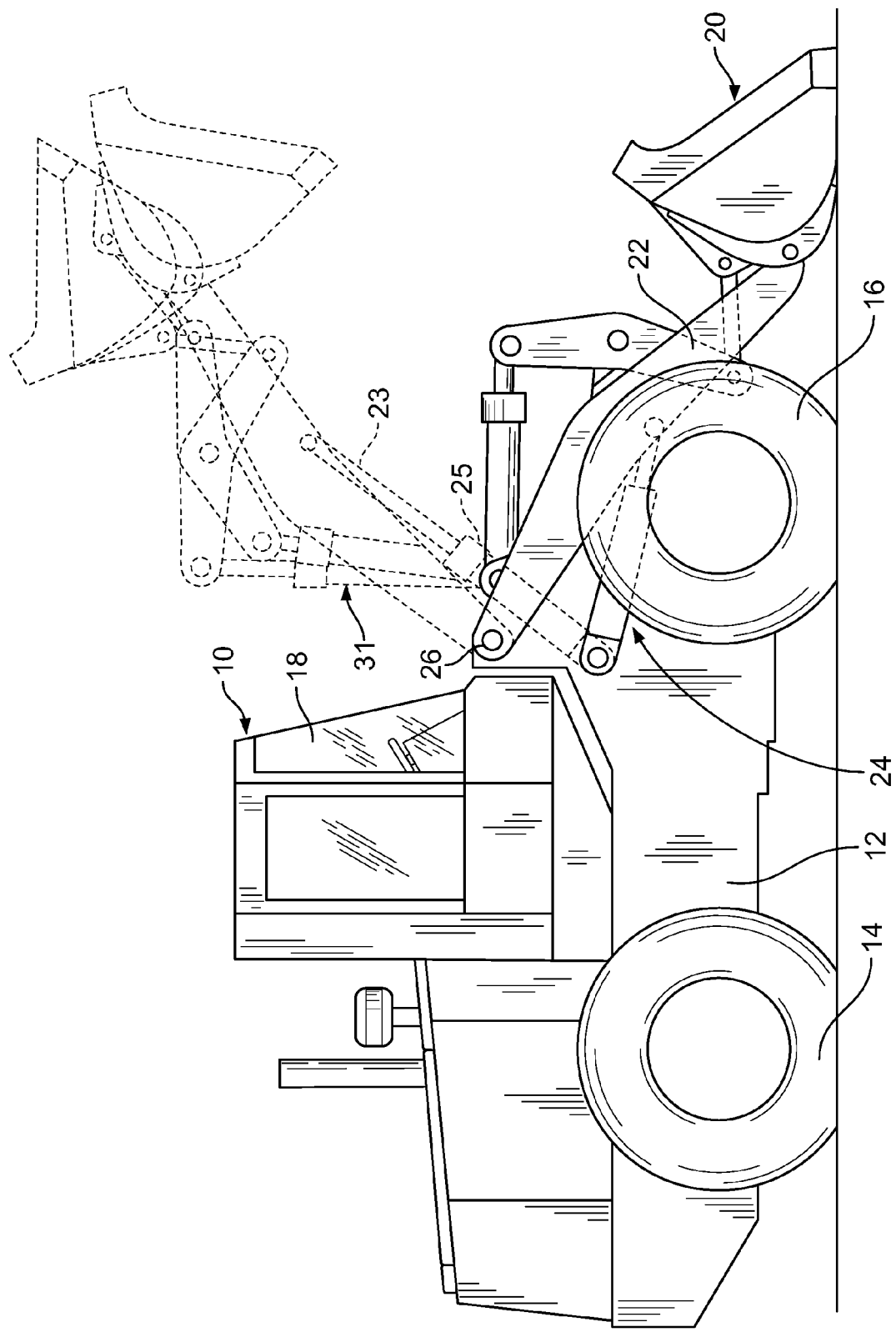
FIG. 2 is a schematic side elevation view of a wheel loader equipped with a bucket shown in various elevational and tilted positions.

Referring now to FIG. 2, a vehicle 10, such as a wheel loader, includes a frame 12; air filled tires 14 and 16; a suitable implement 20, such as a bucket; a pair of lift arms 22; and a pair of hydraulic actuators 24 including hydraulic actuator columns 23 and hydraulic actuator cylinders 25. The frame 12 of vehicle 10 is carried by the tires 14 and 16. The frame 12 includes an operator cab 18. The pair of lift arms 22 is connected to the frame 12 by a pair of arm pivots 26. The lift arms 22 are also connected to the frame by the hydraulic actuators 24 which include the hydraulic actuator columns 23 which translate relative to the hydraulic actuator cylinders 25. The hydraulic actuator columns 23 extend and retract relative to hydraulic actuator cylinders 25, forcing lift arms 22 to pivot about arm pivots 26 causing bucket or implement 20 to be raised or lowered, or rotated, as shown by phantom lines in FIG. 2. The hydraulic actuators 24 raise, lower, and hold the implement 20 relative to the frame 12 to carry out construction tasks such as moving and unloading the contents thereof.

The implement 20 is pivotally connected to the end of the lift arms 22. Extending and retracting hydraulic actuators 31 causes the implement 20 to rotate, as shown in FIG. 2.

Figure 3:
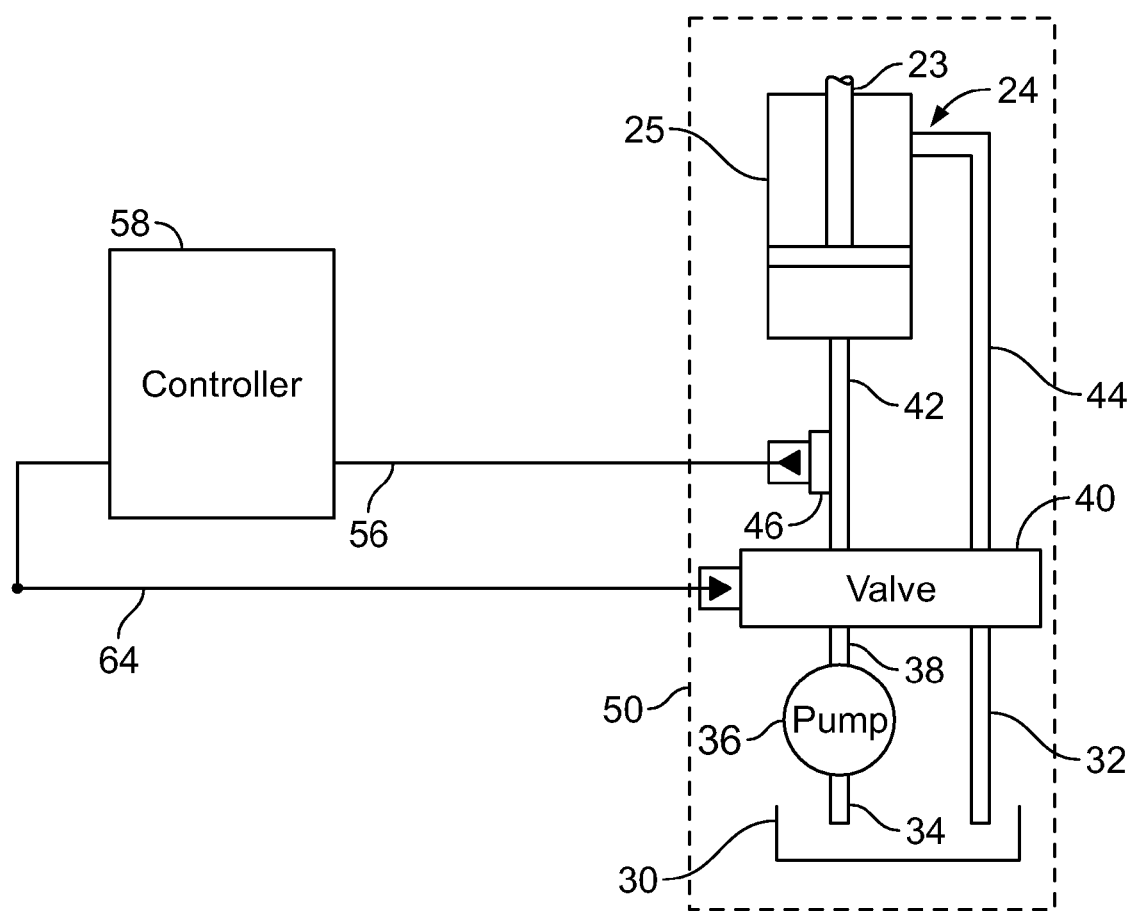
FIG. 3 is a diagrammatic view of a control system used with the tractor and tillage implement illustrated in FIG. 1 and the wheel loader illustrated in FIG. 2 and including a hydraulic system according to the present invention.

A control system including a hydraulic system 50 and an electronic controller 58, shown in FIG. 3, is mounted on the tractor 104 or implement frame 108 in FIG. 1 or frame 12 in FIG. 2. The hydraulic system 50 includes a hydraulic fluid source or reservoir 30; a hydraulic return conduit 32; a hydraulic supply conduit 34; a hydraulic pump 36, which is the source of pressurized hydraulic fluid; hydraulic conduits 38, 42, and 44; an electronic control valve 40; and a transducer 46. The control system includes the hydraulic system 50, a signal data bus 56, an electronic controller 58 and a control signal bus 64. By way of example, electronic control valve 40 may be a Danfoss electro-hydraulic valve with spool position feedback.

The reservoir 30 is fluidly connected to the hydraulic pump 36 by the hydraulic supply conduit 34. The hydraulic pump 36 is fluidly connected to the electronic control valve 40 by the hydraulic conduit 38. The electronic control valve 40 is fluidly connected to the hydraulic actuator 24 by hydraulic conduits 42 and 44. The pressure transducer 46 is also in fluid communication with hydraulic conduit 42. The electronic control valve 40 is also fluidly connected to the reservoir 30 by the hydraulic return conduit 32, thereby completing the hydraulic circuit of the hydraulic system 50. The transducer 46 is connected to the electronic controller 58 by signal data bus 56. The electronic controller 58 is connected to the electronic control valve 40 by the control signal bus 64.

The electronic controller 58 operates to dissipate hydraulic shock in the hydraulic actuators 24, thereby dampening vertical motions of the vehicle. In operation, the transducer 46, which is in fluid communication with the hydraulic fluid, measures the pressure in the hydraulic conduit 42, which is substantially the same as that in the hydraulic actuator 24. A signal from the transducer 46 is electrically communicated to the electronic controller 58 over the signal data bus 56. Using the sampled pressure information, the electronic controller 58 calculates a digital control signal. The digital control signal is passed over the control signal bus 64 to the electronic control valve 40.

By way of example, the electronic controller 58 could be a digital processing circuit, such as an Intel 87C196CA. Alternatively, the electronic controller 58 can be programmed to generate a pulse-width-modulated (PWM) signal. The electronic control valve 40 would in turn be a PWM valve controllable with a PWM signal.

The electronic control valve 40 controls the flow of hydraulic fluid into and out of the hydraulic actuator 24 thereby causing the hydraulic actuator column 23 to move in or out of the hydraulic actuator cylinder 25. Hydraulic fluid is supplied to the electronic control valve 40 from the reservoir 30, through the hydraulic supply conduit 34, to the hydraulic pump 36, which forces the hydraulic fluid through the hydraulic conduit 38 and into the electronic control valve 40. The electronic control valve 40 controls the ingress and egress of hydraulic fluid to the hydraulic actuator 24. The electronic control valve 40 controls both the path of flow for the hydraulic fluid and the volumetric flow of hydraulic fluid. The electronic control valve 40 directs hydraulic fluid either into the hydraulic conduit 42 and out of the hydraulic conduit 44 or into the hydraulic conduit 44 and out of the hydraulic conduit 42, depending on the intended direction of travel of the hydraulic actuator column 23. The control signal received from the control signal bus 64 commands the electronic control valve 40 to control both the direction of hydraulic fluid flow and the volumetric flow of the fluid. Excess hydraulic fluid is directed by the electronic control valve 40 through the hydraulic return conduit 32 and back to the reservoir 30.

The type of vehicles to which the described control can be applied includes, but is not limited to towed implements such as plows, seed planters, harrows and dibbles, excavators, backhoes, snowplows, cranes, skid-steer loaders and wheel loaders (see FIGS. 1 and 2), and other construction or utility vehicles having an implement 20, arm, or boom moveable relative to the vehicle frame 12, 108. The control system is not limited to vehicles with a pair of lift arms 22 such as the vehicle 10, but may also be applied to vehicles with a multiplicity of lift arms or a single lift arm such as on a backhoe or a crane.

The hydraulic actuator 24, 164, used to move the implement 20, 110, is used to dampen bouncing and pitching of the vehicle by actively dissipating the bounce in the implement 20, 110 with a hydraulic lift. The control system may be applied to vehicles using various types of hydraulic actuation systems including hydraulic cylinders and hydraulic motors.

The electronic controller 58, shown in FIG. 3, is programmed to actively dissipate the bounce in the implement 20, 110. As the implement 20, 110 bounces, the pressure of the hydraulic fluid in the hydraulic cylinder or actuator 25, 164 fluctuates. By actively controlling the electronic control valve 40, the hydraulic pressure fluctuations are dissipated or disrupted, causing the bounce of implement 20, 110 to be reduced.

Two methods of controlling the electronic control valve 40 to reduce implement bounce are described, disruptive valve control and cancellation valve control. Both methods are initiated when the hydraulic pressure in the hydraulic actuator spikes beyond a predetermined threshold value 72 or the vehicle is traveling at a speed greater than a predetermined threshold speed. The disruptive valve control method may be initiated manually by positioning a switch in an activation position. In one preferred embodiment the predetermined threshold value 72 is about 1.2 times the pressure required to hold the implement 20, 110 in the raised position.

The pressure spikes 74 can also be determined by measuring the variation in tire 16 deflections, the vertical accelerations of the implement 20, 110 with an accelerometer mounted to the implement 20, 110 or deflections of the frame 12 on which the implement 20, 110 is mounted with a strain gauge and comparing the deflections or accelerations to a predetermined threshold value. The disruptive valve control method can also be initiated when the speed of the vehicle exceeds a predetermined threshold value.

To insure that the pressure spikes 74 are caused by implement bounce while transporting the vehicle and not by pressure spikes caused by using the implement 20, 110 as it digs or lifts a load, the speed of the vehicle may be measured and transmitted to the electronic controller 58. Once the speed of the vehicle exceeds a predetermined threshold speed, such as 15 mph, the electronic controller 58 may initiate the disruptive valve control method or allow the disruptive or cancellation methods to be initiated. If the speed of the vehicle drops below the predetermined threshold speed, the electronic controller 58 may terminate the disruptive or cancellation methods.

When the predetermined threshold value 72 is met and/or the predetermined threshold speed value is met, the electronic controller 58 cycles the electronic control valve 40 from the neutral position to the raise position and back to the neutral position, and from the neutral position to the lower position and back to the neutral position. The flow of hydraulic fluid through the electronic control valve 40 during the raise and lower cycles is small and substantially equal, so that the implement 20, 110 does not move substantially and will maintain its desired transport height when the implement bounce has been dissipated.

Figure 4A:
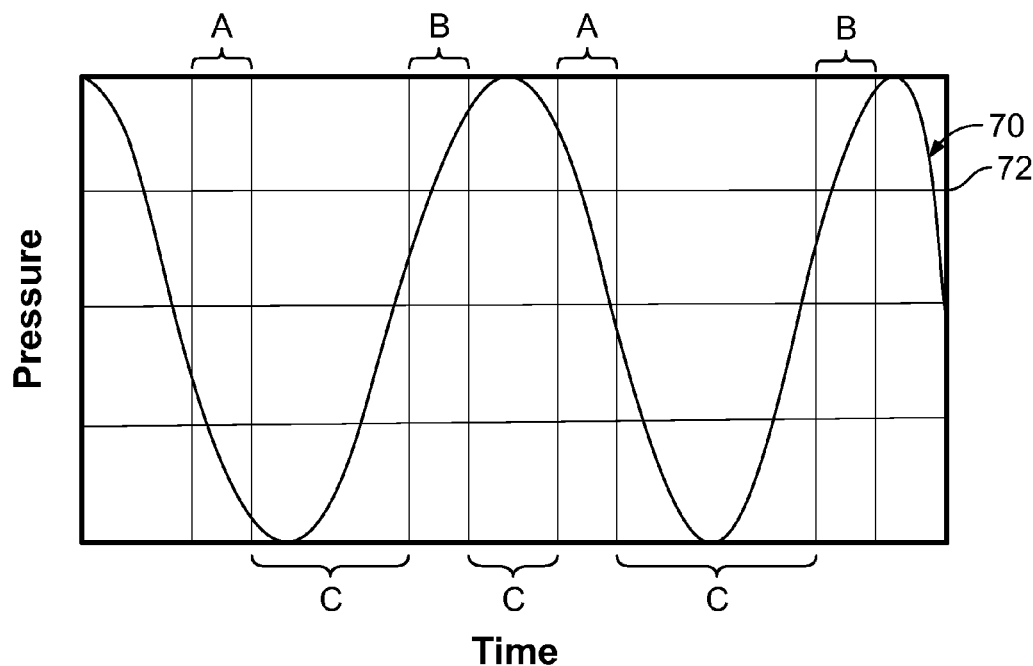
FIGS. 4A and 4B are graphic representations of the pressure of a hydraulic actuator versus time showing the position of an electronic control valve in accordance with the disruptive embodiment of the present invention.
Figure 4B:
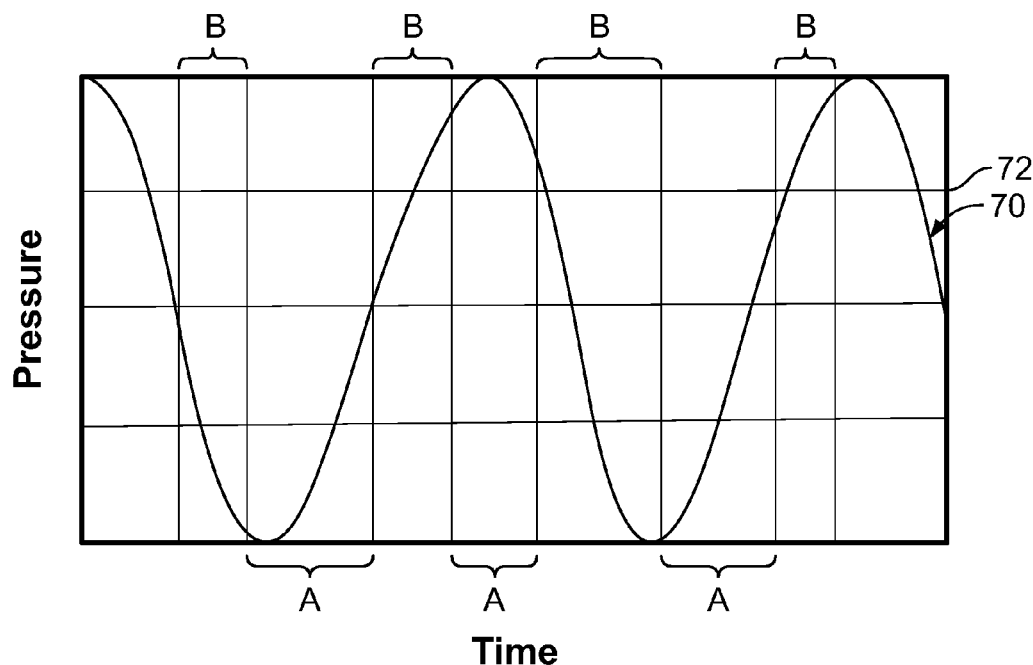

The disruptive valve control method is shown graphically in the FIGS. 4A and 4B. When the activation signal 70 related to the pressure in the hydraulic actuator 24, 164 exceeds a predetermined threshold value 72, the electronic controller 58 calculates a random digital control signal. The digital control signal is passed over the control signal bus 64 to the electronic control valve 40, which is alternately cycled from the neutral position to the raise position and back to the neutral position, and from the neutral position to the lower position and back to the neutral position. That is, the electronic control valve 40 is alternatively moved from its neutral position to its raise position to its neutral position (see time periods A in FIG. 4A) and then from its neutral position to its lower position to its neutral position (see time periods B in FIG. 4A), in repetitive cycles at randomly spaced intervals of time. The length of the time interval between the raise cycles and lower cycles (see time periods C in FIG. 4A) varies randomly.

The hydraulic fluid flow through electronic control valve 40 during the raise cycles and lower cycles is small and substantially equal, so that the implement 20, 110 does not move substantially, i.e., the time intervals A and B are equal. Preferably, each raise cycle follows a lower cycle and each lower cycle follows a raise cycle. However, the raise cycles and lower cycles can be activated randomly, as long is the total number of raise cycles and total number of lower cycles are substantially the same, so that the implement 20, 110 does not move substantially.

Retracting the hydraulic actuator cylinder 25 requires less oil than extending it. Consequently, if intervals A and B are small and equal, the implement 20, 110 could actually lower through the dissipation cycle. To insure the implement 20, 110 is in the fully raised position when the bounce has been dissipated, the electronic control valve 40 cycles can end with the electronic control valve 40 in a prolonged raise position.

In a second embodiment of the disruptive valve control method shown in FIG. 4B, the time interval C between the raise cycles and the lower cycles is substantially zero. In this embodiment, the length of time intervals A and B vary. However, preferably, the total of the length of time of intervals A substantially equals the total of the length of time of intervals B, so that the implement 20 does not move substantially. Again, the electronic control valve 40 cycles can end with the electronic control valve 40 in a prolonged raise position to insure that the implement 20, 110 is in the fully raised position when the bounce has been dissipated.

By generating the random hydraulic pulses in the hydraulic actuator 24, 164, the hydraulic pulses created by the implement bounce will dissipate faster than if the electronic control valve 40 were continuously closed in the neutral position. The random pattern of the raise and lower cycles during the disruptive valve control method prevents the electronic control valve 40 from exciting the implement bounce.

Figure 5A:
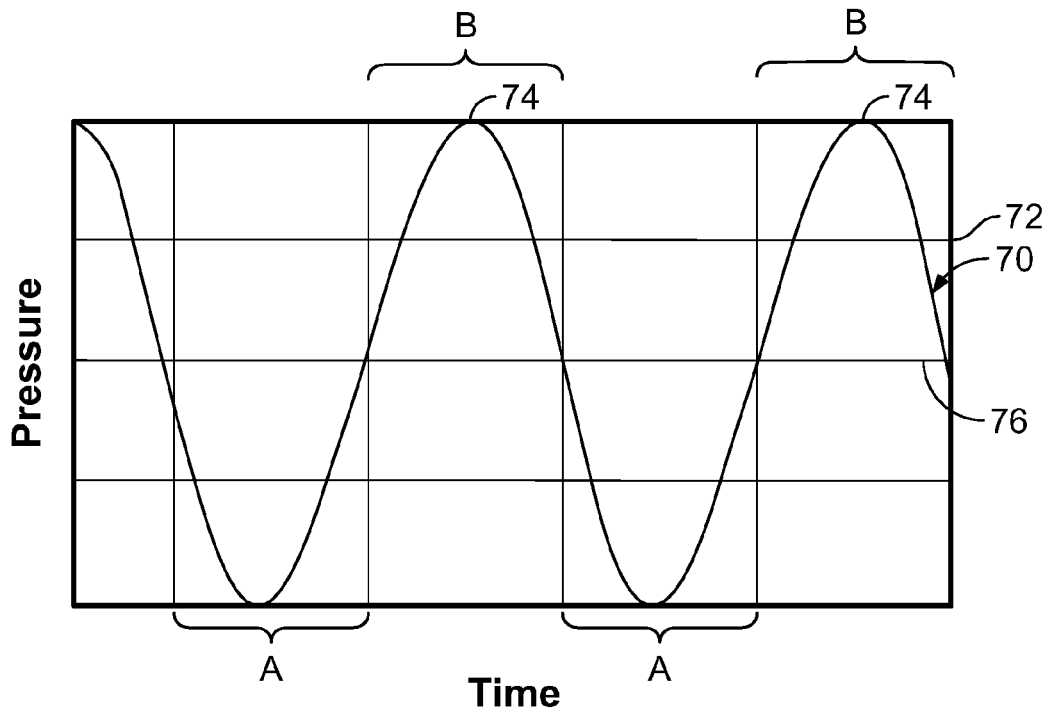
FIGS. 5A and 5B are graphic representations of the pressure of a hydraulic actuator versus time showing the position of an electronic control valve in accordance with the cancellation embodiment of the present invention.
Figure 5B:
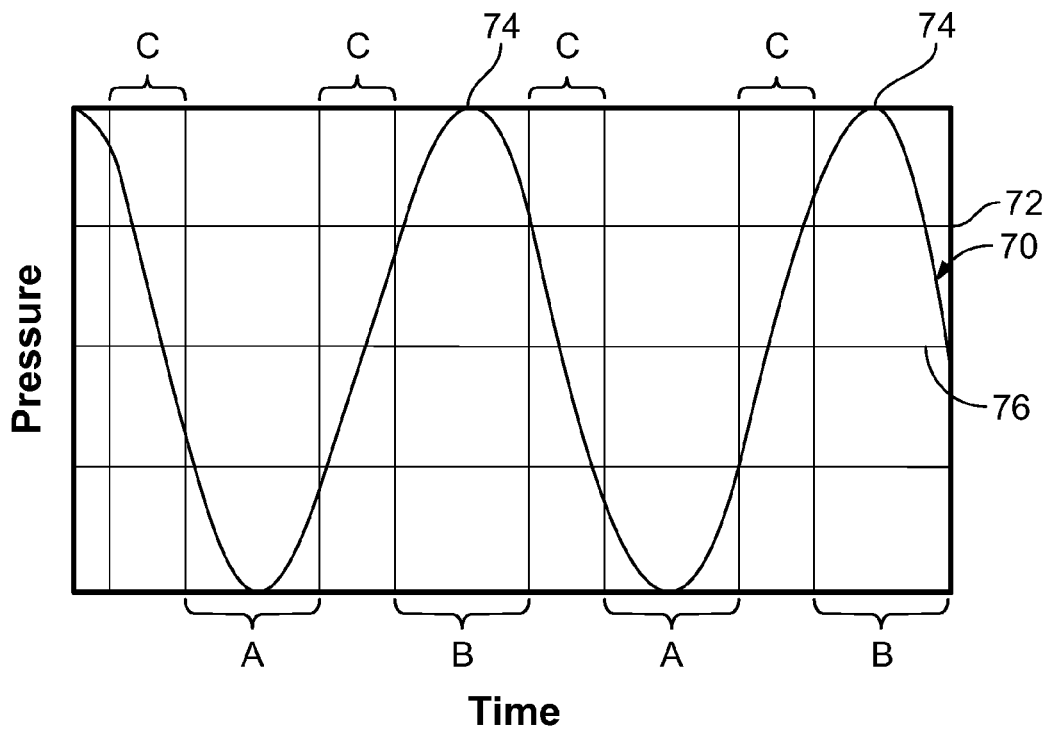

In the cancellation method, shown in FIGS. 5A and 5B, the electronic controller 58 determines the frequency and period at which the implement 20, 110 is bouncing. Assuming that the dampening forces and mass of the implement remain constant, the frequency of the bounce will remain constant. The frequency of the implement bounce is determined by measuring the pressure in the hydraulic actuator 24, 110.

The electronic controller 58 then controls the electronic control valve 40 movement from its neutral position to its raise position to its neutral position (see time interval A in FIG. 5A) and then from its neutral position to its lower position to its neutral position (see time interval B in FIG. 5A) in repetitive cycles out of phase with the bouncing of implement 20, 110 to create a cancelling effect. The frequency of the bouncing is determined by the length of time between the pressure spikes 74, as measured by the transducer 46 or by other means.

When the activation signal 70 related to the pressure in the hydraulic actuator 24, 164 as measured by the transducer 46 is greater than steady state 76, the electronic control valve 40 would be positioned in the lower position (shown as time interval B in FIG. 5A), absorbing some of the energy by allowing the implement 20, 110 to lower slightly. When the activation signal 70 related to the pressure in the hydraulic actuator 24, 164 as measured by the transducer 46 is less than steady state 76, the electronic control valve 40 would be positioned in the raise position (shown as time interval A in FIG. 5A), raising the implement 20, 110 slightly.

Similar to the disruptive control method, the flow of hydraulic fluid through the electronic control valve 40 during raising and lowering of the implement 20, 110 is small and substantially equal, so that the implement 20, 110 does not move substantially. Preferably, each raise cycle follows a lower cycle and each lower cycle follows a raise cycle. However, the raise cycles and lower cycles can be activated randomly, as long is the total number of raise cycles and total number of lower cycles are substantially the same, so that the implement 20 does not move substantially. Again, the electronic control valve 40 cycles can end with the electronic control valve 40 in a prolonged raise position to insure that the implement 20, 110 is in the fully raised position when the bounce has been dissipated.

Also, as shown in FIG. 5B, the length of time of the intervals A and B may be less than on half the period at which the implement 20, 110 is bouncing. Therefore, the electronic control valve 40 is in the neutral position during the time interval C.

In both disruptive and cancellation methods, when the pressure spikes 74 have been reduced below the predetermined threshold value 72 or a predetermined time has passed, the electronic control valve 40 is returned to its neutral position. If the pressure spikes 74 exceed the threshold value again, the process is repeated until the pressure spikes 74 have been reduced below the predetermined threshold value 72 or a predetermined time has passed.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A control system for a vehicle of the type including an implement moveable relative to the vehicle, the system comprising:
    a pressurized fluid source;
    a hydraulic actuator mechanically coupled between the vehicle and the implement to lift the implement;
    an electronic control valve fluidly coupled to the pressurized fluid source and the hydraulic actuator to control the flow of pressurized fluid applied to the hydraulic actuator by the pressurized fluid source, the electronic control valve having raise, neutral and lower positions, wherein pressurized fluid is applied to the hydraulic actuator by the pressurized fluid source to raise the implement relative to the vehicle when the electronic control valve is in the raise position, the hydraulic actuator is isolated from the pressurized fluid source when the electronic control valve is in the neutral position and pressurized fluid is applied to the hydraulic actuator by the pressurized fluid source to lower the implement relative to the vehicle when the electronic control valve is in the lower position;
    a sensor or a switch to generate an activation signal, wherein the sensor generates an activation signal related to the pressure in the hydraulic actuator or speed of the vehicle or the switch has an activation position and a non-activation position; and
    an electronic controller electrically coupled to the electronic control valve and the sensor or switch, the electronic controller being programmed to generate valve command signals based upon the activation signal or the position of the switch and apply the command signals to the electronic control valve to cause the electronic control valve to control the flow of pressurized fluid applied to the actuator to actively dissipate implement bounce, wherein the electronic controller is programmed to compare the activation signal to a predetermined threshold value or determine the position of the switch, and when the predetermined threshold value is exceeded or when the switch is positioned in the activation position, the electronic controller configured to activate a dissipation routine moving the valve between multiples positions in response to a single activation signal exceeding the threshold or the switch located in the activation position, the dissipation routine comprising cycling the electronic control valve through a series of movements including (a) at least once from the neutral position to the raise position and back to the neutral position and (b) at least once from the neutral position to the lower position and back to the neutral position, the movements creating hydraulic pulses in the hydraulic actuator and wherein during each routine at least one pulse is transmitted to each side of the actuator.

2. The control system of claim 1, wherein the sensor is a transducer selected from the group consisting of a transducer that measures an amount of tire deflections of the vehicle, and a strain gauge that measures the deflection of the frame on which the implement is mounted.

3. The control system of claim 1, wherein the electronic controller is programmed to activate the electronic control valve to alternately cycle the electronic control during the dissipation routine (a) from the neutral position to the raise position and back to the neutral position and (b) from the neutral position to the lower position and back to the neutral position when the predetermined threshold value is exceeded or the switch is in the activation position wherein the dissipation routine is configured such that the total amount of time the valve is in the raise position is generally equal to the total amount of time the valve is in the lower position.

4. The control system of claim 1, wherein electronic controller is programmed to cycle the electronic control valve in the series of movements independent of the frequency of the implement bounce (a) from the neutral position to the raise position and back to the neutral position and (b) from the neutral position to the lower position and back to the neutral position when the predetermined threshold value is exceeded or the switch is in the activation position and substantially the same amount of fluid is directed through the valve in the raise position as flow through in the lower position.

5. The control system of claim 1, wherein the electronic controller is programmed to determine the frequency and period of the implement bouncing and control the positioning of the electronic control valve to be out of phase with the implement bounce when the predetermined threshold value is exceeded wherein the frequency of the pulses are transmitted out of phase with the implement bounce if the electronic control valve is activated by the predetermined threshold value being exceeded.

6. The control system of claim 1, wherein the electronic controller dissipation routine is programmed to position the electronic control valve during the last cycle in the raise position for a period of time greater than the period of time in which the electronic control valve is in the raise position during the preceding cycles.

7. A vehicle comprising:
a wheeled vehicle comprising a frame;
an implement movably supported by the vehicle;
a pressurized fluid source supported by the vehicle;
a hydraulic actuator mechanically coupled between the implement and the vehicle or between the frame and the wheels to lift the implement relative to the vehicle;
an electronic control valve fluidly coupled to the pressurized fluid source and the hydraulic actuator to control the flow of pressurized fluid applied to the hydraulic actuator by the pressurized fluid source, the electronic control valve having raise, neutral and lower positions, wherein pressurized fluid is applied to the hydraulic actuator by the pressurized fluid source to raise the implement relative to the vehicle when the electronic control valve is in the raise position, the hydraulic actuator is isolated from the pressurized fluid source when the electronic control valve is in the neutral position and pressurized fluid is applied to the hydraulic actuator by the pressurized fluid source to lower the implement relative to the vehicle when the electronic control valve is in the lower position;
a transducer or a switch for generating an activation signal, wherein the transducer generates an activation signal related to the pressure in the hydraulic actuator or speed of the vehicle or the switch has an activation position and a non-activation position; and
an electronic controller electrically coupled to the electronic control valve and the transducer or switch, the electronic controller being programmed to generate valve command signals based upon the activation signal or the position of the switch and apply the command signals to the electronic control valve to cause the electronic control valve to control the flow of pressurized fluid applied to the actuator to actively dissipate implement bounce,
wherein the electronic controller is programmed to compare the activation signal to a predetermined threshold value or determine the position of the switch, and when the predetermined threshold value is exceeded or when the switch is positioned in the activation position, the electronic controller activates the electronic control valve to cycle the electronic control valve in a series of movements (a) from the neutral position to the raise position and back to the neutral position and (b) from the neutral position to the lower position and back to the neutral position, the movements creating hydraulic pulses in the hydraulic actuator, the controller configured to control the valve during the dissipation routine to supply hydraulic pulses at a frequency different from the frequency of the implement bounce.

8. The vehicle of claim 7, wherein the transducer is selected from the group consisting of a transducer that measures an amount of tire deflections of the vehicle, a strain gauge that measures the deflection of the frame on which the implement is mounted, and a speedometer that measures the speed of the vehicle.

9. The vehicle of claim 7, wherein the electronic controller is programmed to activate the electronic control valve to alternately cycle the electronic control during a dissipation routine (a) from the neutral position to the raise position and back to the neutral position and (b) from the neutral position to the lower position and back to the neutral position when the predetermined threshold value is exceeded or the switch is in the activation position wherein the dissipation routine is configured such that the total amount of time the valve is in the raise position is generally equal to the total amount of time the valve is in the lower position.

10. The vehicle of claim 7, wherein electronic controller is programmed to control the valve during the dissipation routine through a series of valve positions independent of the frequency of the implement bounce in the series of movements (a) from the neutral position to the raise position and back to the neutral position and (b) from the neutral position to the lower position and back to the neutral position when the predetermined threshold value is exceeded or the switch is in the activation position and substantially the same amount of fluid flows through the valve in the raise position as flow through in the lower position.

11. The vehicle of claim 7, wherein the electronic controller is programmed to determine the frequency and period of the implement bouncing and control the positioning of the electronic control valve to be out of phase with the implement bounce when the predetermined threshold value is exceeded.

12. The vehicle of claim 7, wherein the electronic controller is programmed to position the electronic control valve during the last cycle in the raise position for a period of time greater than the period of time in which the electronic control valve is in the raise position during the preceding cycles.

13. A method of dissipating implement bounce in a wheeled vehicle of the type including a frame and an implement moveable relative to the vehicle comprising:
providing the wheeled vehicle having (a) an implement movably supported by the vehicle, (b) a pressurized fluid source supported by the vehicle, (c) a hydraulic actuator mechanically coupled between the implement and the vehicle or between the frame and the wheels to lift the implement relative to the vehicle, (d) an electronic control valve fluidly coupled to the pressurized fluid source and the hydraulic actuator to control the flow of pressurized fluid applied to the hydraulic actuator by the pressurized fluid source, (e) a transducer or a switch for generating an activation signal, wherein the transducer generates an activation signal related to the pressure in the hydraulic actuator or speed of the vehicle, or the switch has an activation position and a non-activation position, and (f) an electronic controller electrically coupled to the electronic control valve and the transducer or switch, the electronic control valve having raise, neutral and lower positions, wherein pressurized fluid is applied to the hydraulic actuator by the pressurized fluid source to raise the implement relative to the vehicle when the electronic control valve is in the raise position, the hydraulic actuator is isolated from the pressurized fluid source when the electronic control valve is in the neutral position and pressurized fluid is applied to the hydraulic actuator by the pressurized fluid source to lower the implement relative to the vehicle when the electronic control valve is in the lower position;

comparing the activation signal to a predetermined threshold value, and if the activation signal exceeds the predetermined threshold value, activating a dissipation routine wherein the electronic control valve to cycle the electronic control valve in a series of movements (a) at least once from the neutral position to the raise position and back to the neutral position and (b) at least once from the neutral position to the lower position and back to the neutral position when the predetermined threshold value is exceeded or when the switch is positioned in the activation position, the movements creating hydraulic pulses in the hydraulic actuator and wherein during each routine at least one pulse is transmitted to each side of the actuator, wherein the frequency of the hydraulic pulses is different than the frequency of the implement bounce.

14. The method of claim 13, wherein the transducer is selected from the group consisting of a transducer that measures an amount of tire deflections of the vehicle, a strain gauge that measures the deflection of the frame on which the implement is mounted, and a speedometer that measures the speed of the vehicle.

15. The method of claim 13, wherein the electronic control valve is activated to by the controller to cycle through a series of valve positions at a frequency independent of and different from the frequency of the implement bounce (a) from the neutral position to the raise position and back to the neutral position and (b) from the neutral position to the lower position and back to the neutral position when the predetermined threshold value is exceeded or the switch is in the activation position and substantially the same amount of fluid flows through the valve in the raise position as flow through in the lower position during each routine.

16. The method of claim 13, wherein as the electronic control valve is cycled during the dissipation routine in response to a single activation signal exceeding the threshold or the switch located in the activation position in the series of movements (a) from the neutral position to the raise position and back to the neutral position and (b) from the neutral position to the lower position and back to the neutral position, the flow of pressurized fluid through the electronic control valve during each raise cycle and each lower cycle is small and substantially equal.

17. The method of claim 13, wherein the electronic control valve is activated to alternately cycle the electronic control during the dissipation routine (a) from the neutral position to the raise position and back to the neutral position and (b) from the neutral position to the lower position and back to the neutral position when the predetermined threshold value is exceeded or the switch is in the activation position.

18. The method of claim 13, wherein electronic controller cycles the electronic control valve randomly in the series of movements (a) from the neutral position to the raise position and back to the neutral position and (b) from the neutral position to the lower position and back to the neutral position, when the predetermined threshold value is exceeded or the switch is in the activation position.

19. The method of claim 13, wherein electronic controller determines the frequency and period of the implement bouncing and controls the positioning of the electronic control valve to be out of phase with the implement bounce when the predetermined threshold value is exceeded.

20. The method of claim 13, wherein the electronic controller positions the electronic control valve during the last cycle in the raise position for a period of time greater than the period of time in which the electronic control valve is in the raise position during the preceding cycles.

* * * * *